April 21, 1970     J. W. PERRY     3,506,998

TRASH GATHERING, CUTTING, AND DISPOSING MACHINE

Filed Aug. 14, 1967     5 Sheets-Sheet 1

INVENTOR
JAMES W. PERRY
BY

INVENTOR
JAMES W. PERRY

INVENTOR
JAMES W. PERRY

INVENTOR
JAMES W. PERRY

United States Patent Office 3,506,998
Patented Apr. 21, 1970

3,506,998
TRASH GATHERING, CUTTING, AND DISPOSING MACHINE
James W. Perry, 302 W. Coulter, Phoenix, Ariz.
Filed Aug. 14, 1967, Ser. No. 660,285
Int. Cl. E01h 1/08
U.S. Cl. 15—339                                               7 Claims

ABSTRACT OF THE DISCLOSURE

A trash gathering, cutting and disposing machine comprising a vehicle having a frontal operator's compartment, and having a hollow duct means movable upward, downward, sideways, and longitudinally extendable to various positions at the front of the vehicle and at the front of the operator's compartment so as to pick up trash on the ground, the duct structure being hollow and having an open end disposable adjacent the ground, and carrying rotary cutters which are adapted to cut trash and impel the trash upwardly into the open duct, and where the duct structure carries power operated means for rotating the cutters.

---

This invention relates to a trash gathering, cutting, and disposing machine, and more particularly, to a trash gathering, cutting, and disposing machine which is adapted to gather, cut and dispose piles of trash, such that the trash is cut into small particles and may be disposed and delivered into a transportation vehicle, such as a truck or trailer adapted to carry such cut trash to an area in which the trash may be utilized, burned, buried, or otherwise disposed of.

BACKGROUND OF THE INVENTION

Heretofore trash, such as tree limbs, shubbery cuttings, small boards, palm fronds, and various other trash which is collected in municipal areas has been disposed of by means of a large truck or vehicle carrying a rotary cutter, and having a large box-shaped bed for the collection of cut trash.

These prior art trash disposal vehicles are intermittently used to cut and dispose trash, and later to carry the trash to a city dump or comparable location where the trash may be utilized or disposed of in some manner. Additionally, the prior art vehicles have been so arranged that the rotary cutting mechanism is communicating with the hopper, and the trash is manually fed by human laborers into the hopper and the rotary cutter, and from this area, the trash is propelled in some manner to a container area of the truck which is used to transport the trash to the dump or disposal area.

The use of the expensive rotary cutting equipment in this instance, can only be intermittent, and much of the time this rotary equipment is in transit while the truck is transporting the cut trash to a city dump or other ultimate disposal area. This prior art combination necessitates the use of a number of the vehicles operating a substantial part of the time, as transport vehicles, and the expensive cutting equipment is also out of operation during this transportation of cut trash.

The foregoing prior art equipment imposes a great financial investment upon a municipality simply because each of the transportation vehicles also must be equipped with a trash cutting facility, which is a very expensive facility.

SUMMARY OF THE INVENTION

The present invention comprises a vehicle having a frontal area for carrying an operator, and a forwardly movable duct structure which is movable up and down, sideways, and telescopically extendable, and which is provided with a rotary inlet area operated on a horizontal axis; and rotary cutter means in the inlet area adapted to cut trash and to impel the same up the duct structure of the invention so that the operator of the invention may pick up trash directly without manual labor, cut the trash and move it through the duct structure to a secondary vehicle which serves as a transport vehicle, and allows the vehicle of the invention to remain constantly in the operation of cutting trash.

Accordingly, it is an object of the present invention to provide a novel trash gathering, cutting, and disposing machine comprising a vehicle having a forward operator's compartment, a duct structure which is movable up and down and sideways, and having an end rotatable on a horizontal axis, said end being an open trash gathering and receiving end adapted to be placed in position adjacent the ground and upon a pile of trash for cutting the trash and impelling it, when in cut form, upwardly through the duct structure and to an area to be delivered into a transport vehicle.

Another object of the invention is to provide a novel trash gathering, cutting and disposing machine which provides for great trash gathering, cutting and disposing capacity in a single machine when accompanied by a plurality of transport machines.

Another object of the invention is to provide a novel trash gathering, cutting and disposing machine mounted on a vehicle having an operator's compartment at the forward portion thereof, and wherein a duct structure is extendable forwardly of the vehicle in telescopic relation thereto, and is movable upwardly, downwardly, and sideways, and which also has a rotating open end structure carrying rotary cutters, and means for power operation of the cutters.

Another object of the invention is to provide a trash gathering, cutting, and disposing machine of the foregoing character which additionally provides means for creating an aspirating air flow in the duct structure of the invention for accelerating and assisting the movement of cut trash in the duct to deliver this trash to an auxiliary transport vehicle.

Another object of the invention is to provide in addition to the foregoing, means for spraying moisture into cut trash in the duct structure of the invention to alleviate the tendency of the duct structure to deliver dust and small particles, which fly about in the air.

Another object of the invention is to provide a novel trash gathering, cutting, and disposing machine having novel rotary cutter means comprising three rotary cutters particularly adapted for cutting and impelling trash into a duct structure of the invention, and further to provide extendable fingers for raking a pile of trash directly below the rotary cutters so that the trash may be agitated and moved about into position to be contacted by the rotary cutters, and to thus be cut thereby and impelled into the hollow duct structure of the invention.

Further objects and advantages of the present invention may be apparent from the following specification, appended claims, and accompanying drawings.

Figure 1:
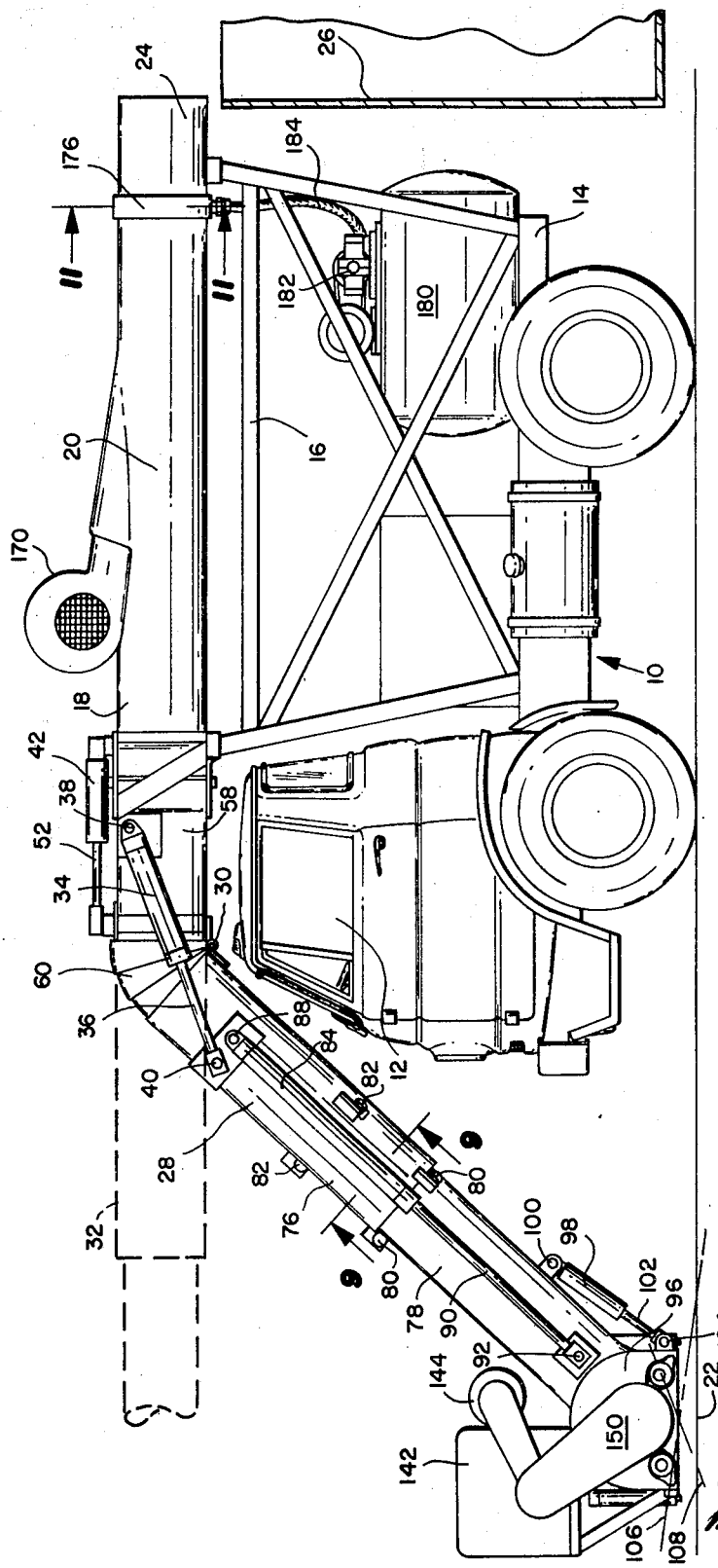
FIG. 1 is a side elevational view of a trash gathering, cutting, and disposing machine in accordance with the present invention, and showing by broken lines varying positions of the duct structure and the inlet end thereof, and also further showing fragmentarily, a transport vehicle body into which cut trash may be delivered by the machine of the invention.
Figure 2:
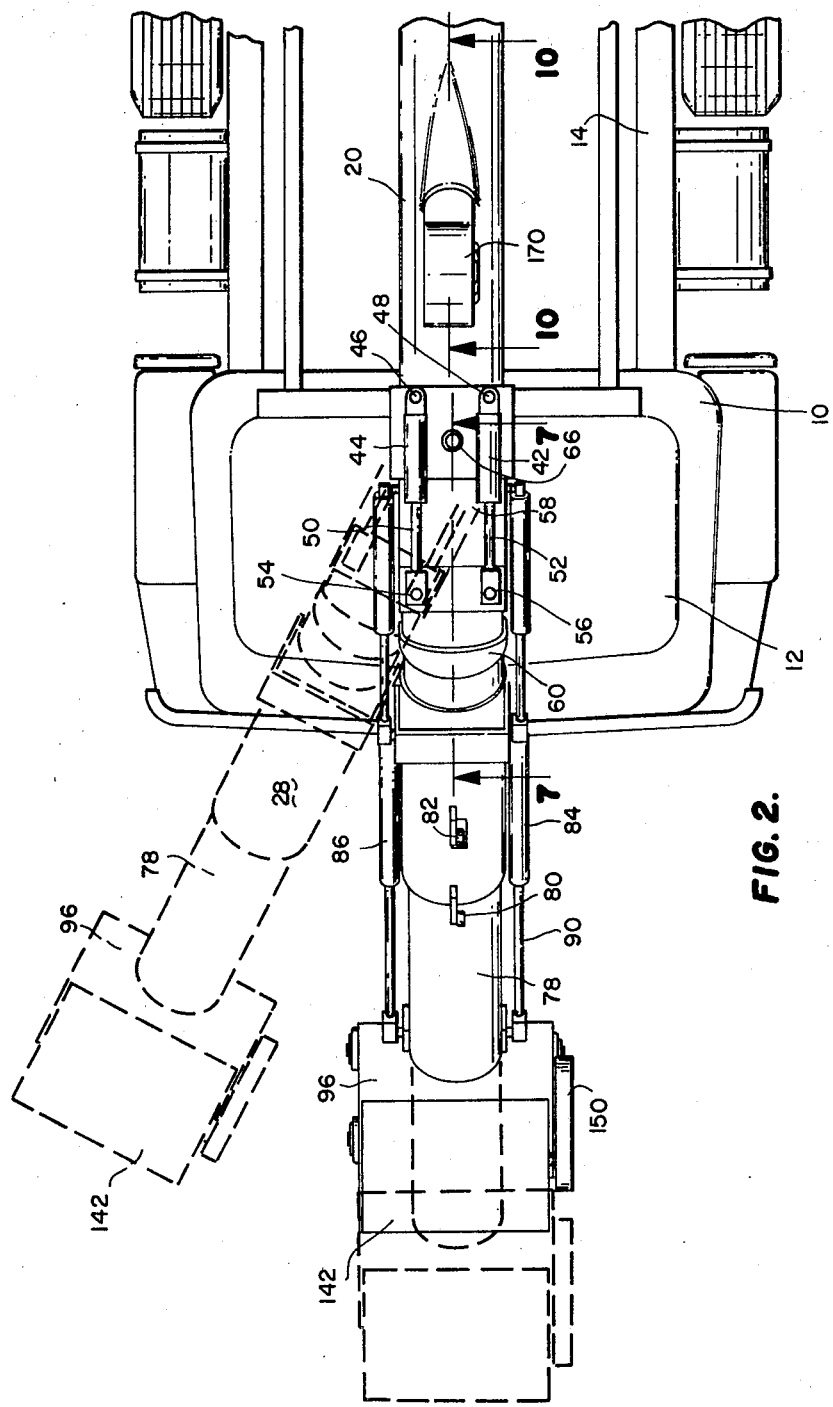
FIG. 2 is a fragmentary top or plan view of the trash gathering, cutting and disposing machine of the invention.
Figure 3:
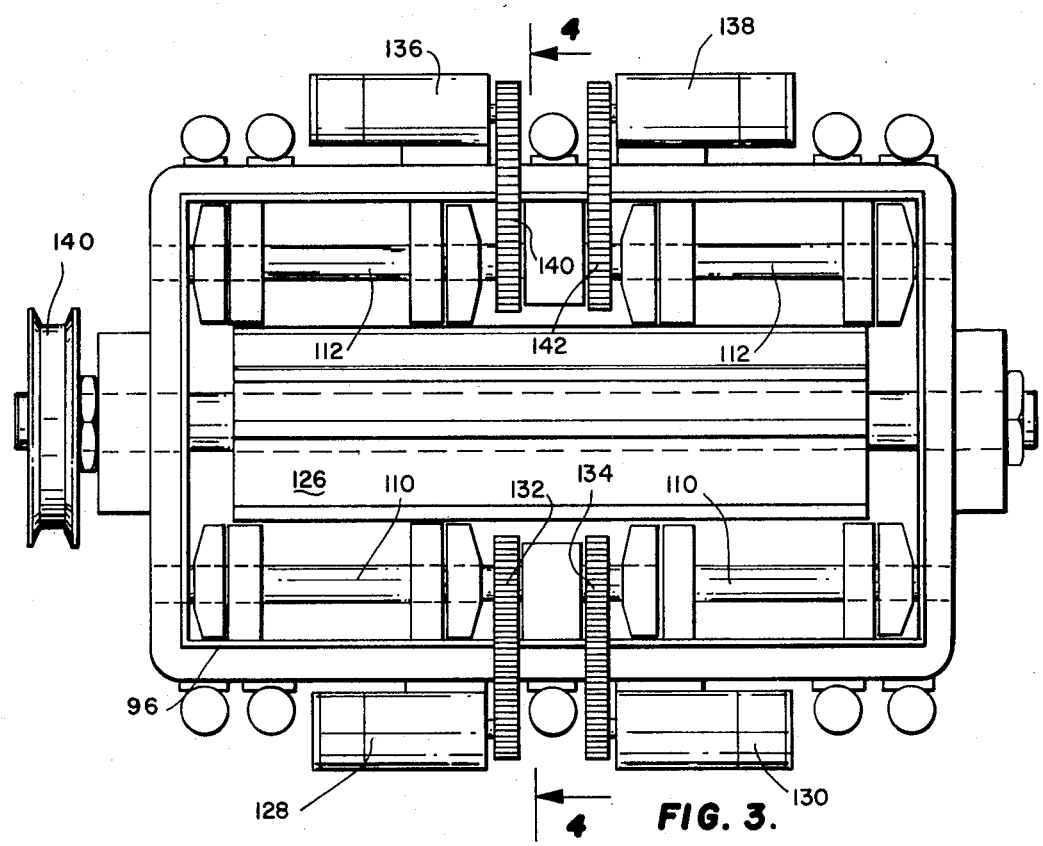
Figure 5:
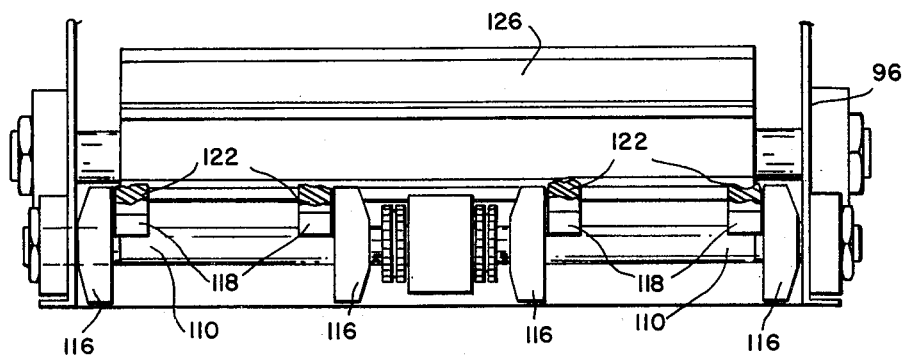
Figure 4:
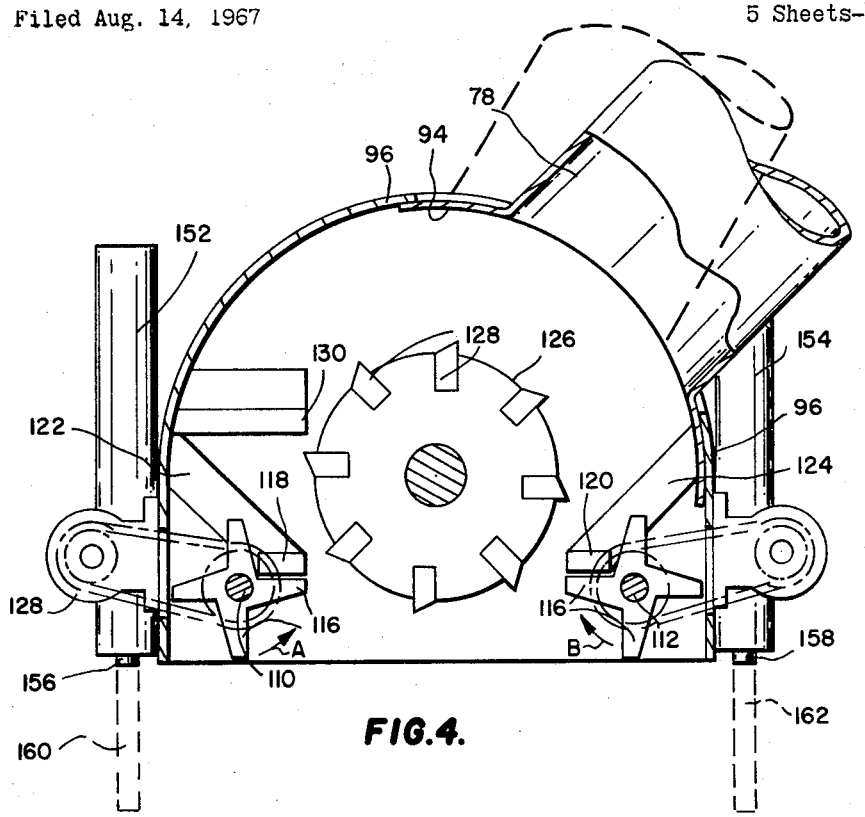
Figure 6:
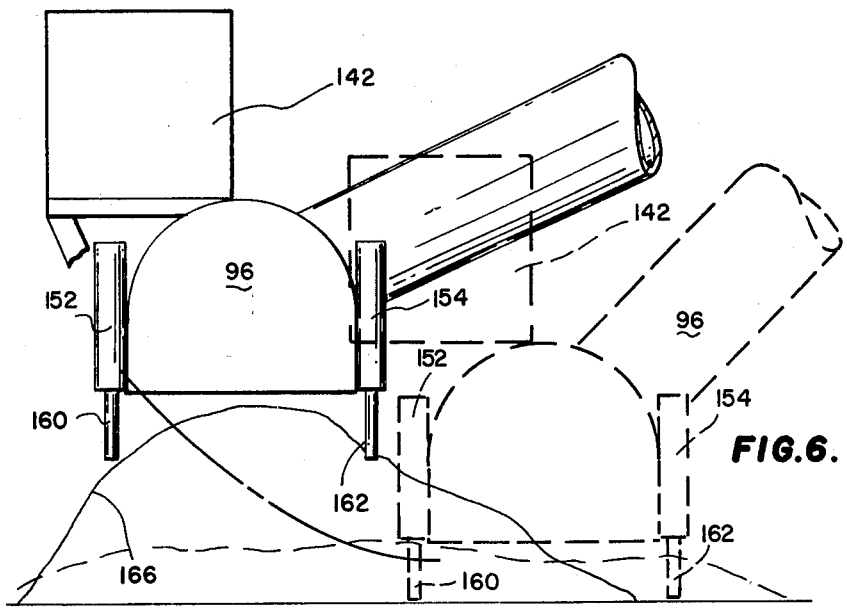
Figure 7:
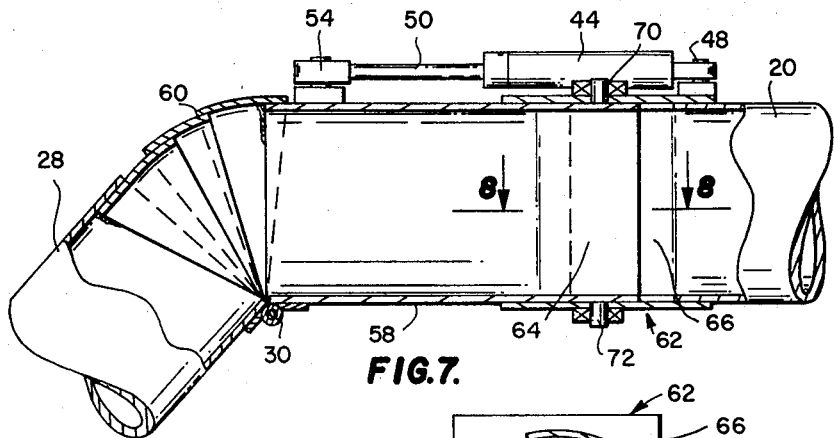
Figure 8:
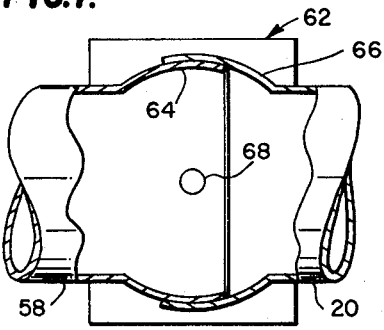
Figure 9:
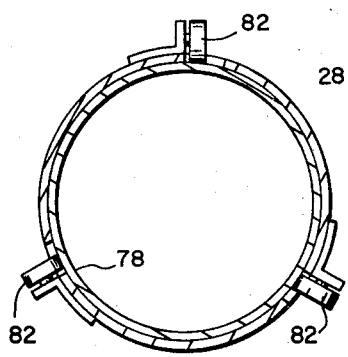
Figure 10:
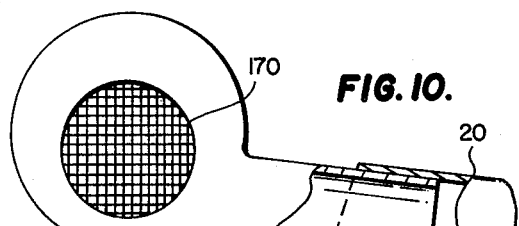
Figure 11:
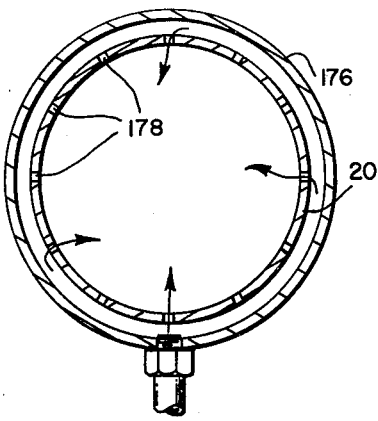

3 showing varying lateral positions of the duct means and the rotary cutter means of the invention by broken lines;

FIG. 3 is an enlarged fragmentary plan sectional view taken from the line 3—3 of FIG. 1, showing details of the rotary trash cutting mechanism, including cutting rotors and stator blades, and also motor means for rotating these rotary cutters;

FIG. 4 is a fragmentary sectional view taken from the line 4—4 of FIG. 3;

FIG. 5 is a fragmentary sectional view taken from the line 5—5 of FIG. 4;

FIG. 6 is a fragmentary side elevational view similar to that as shown in FIG. 1, but showing the extendable trash gathering and raking fingers of the invention extended downwardly in relation to a pile of trash being raked into a position to be engaged by the rotary cutters of the invention, and showing varying positions of the open end of the duct structure and the trash raking and gathering fingers by broken lines;

FIG. 7 is an enlarged fragmentary sectional view taken from the line 7—7 of FIG. 2;

FIG. 8 is a fragmentary sectional view taken from the line 8—8 of FIG. 7, showing a varying position of portions of the duct structure by broken lines;

FIG. 9 is a fragmentary sectional view taken from the line 9—9 of FIG. 1;

FIG. 10 is an enlarged fragmentary sectional view taken from the line 10—10 of FIG. 2; and FIG. 11 is an enlarged fragmentary sectional view taken from the line 11—11 of FIG. 1.

DESCRIPTION OF THE PREFERRED EMBODIMENTS

The present invention comprises a vehicle 10, and preferably a conventional cabover truck having an operator's compartment 12 in the forward portion thereof, which will afford the operator a full view of areas forwardly of the truck 10, and in close proximity to the front end thereof.

Mounted on a frame portion 14 of this truck is a superstructure frame 16 carrying a duct structure 18 of the invention. This duct structure 18 is provided with a horizontal portion 20 generally above the frame 16, and preferably thereabove, however, the duct structure 20 could be at the side of the truck, but would be inconvenient with respect to opening the doors of the cab or the like. If, however, the cab 12 or operator's compartment 12 should be narrow, the duct structure could be within the confines of the vehicle, and at one side.

The duct structure is provided with an open pickup end 22 and a trash delivery end 24. The pickup end 22 normally being operable at the front of the truck in full view of the operator's compartment 12, and the trash delivery end 24 being adapted to deliver trash into a body 26 of a transportation vehicle.

The duct structure 18 comprises a hollow duct section 28 pivotally connected to the horizontal section 20 by means of a pivot pin or shaft 30, this being on a horizontal axis, and permitting pivotal movement of the duct structure section upward to a broken line position 32, as shown in FIG. 1 of the drawings.

The power for moving the duct structure section 28 to the broken line position 32 is supplied by a pair of hydraulic cylinders 34 having plungers 36, the cylinders being pivoted to the duct section 20 at trunnions 38 and the plungers 36 being pivoted to the duct session 28 by pins 40.

The duct section 28 is therefore movable upwardly about a horizontal axis of the shaft 30 relative to the stationary horizontal duct section 18.

The duct structure section 28 is movable laterally from side to side by means of hydraulic cylinders 42 and 44 which are shown best in FIG. 2 of the drawings, these cylinders being mounted on pivot pins 46 and 48, respectively, and being provided with respective plungers 50 and 52 pivoted by pins 54 and 56 relative to the duct section 28.

The plungers 52 are pivotally mounted to an intermediate duct section 58 which is provided with a flexible duct section 60 connected to the duct section 28.

The intermediate duct section 58 is thus pivotal from side to side carrying the pivot pin or shaft 30 and the duct section 28.

An opposite end of the intermediate duct section 58 from the flexible duct section is provided with a ball joint assembly, generally indicated 62 in FIGS. 7 and 8 of the drawings.

The intermediate duct section 56 being provided with a spherical ball joint hollow portion 64 concentrically capped in a comparable externally engaged section 66 of the horizontal duct section, hereinbefore described.

Thus, the cylinders 42 and 44, when energized, will pivot the intermediate duct section 58 about an axis, generally indicated at 68, which is the center of the arcuate joint sections 64 and 66. These sections being pivoted together about trunnion shafts 70 and 72, which project from the joint section 64 through the side walls of a joint section 66, these being flat top and bottom, as indicated in FIGS. 7 and 8 of the drawings.

The duct section 28 is provided with a tubular portion 76 and a relatively telescopic portion 78 which is telescopically mounted internally thereof, and guided by pairs of rollers 80 and 82, while hydraulic cylinders 84 and 86 serve as power operated means to extend and retract the telescopic means comprising the telescopic tubular sections 76 and 78 of the duct section 28.

The hydraulic cylinders 84 and 86 are similar, and attention is therefore directed to the hydraulic cylinder 84 which is mounted on a pin 88 carried by the duct section 28. This cylinder 84 is provided with an extendable and retractable plunger 90 being pivoted on a pin 92 at a lowermost portion or lower area of the telescopic duct section 78.

Pivoted relative to a lower arcuate-shaped flange 94 of the duct section 78 is a duct inlet end structure 96 which is open and adapted to receive trash, as will be hereinafter described.

The arcuate channel bearing structure 94 at the end of the duct section 78 provides means for pivoting the open end housing or open end structure 96, and a hydraulic cylinder 98 being pivoted on a pin 100 is provided with a plunger 102 pivoted at 104, this hydraulic cylinder 98 thus pivots the open end housing 96 into various inclined planes, as indicated by broken lines 106 and 108, to accommodate inclined disposition of a pile of trash on the ground or variations in the configuration of the terrain from which trash is to be picked up.

Referring to FIG. 4 of the drawings, the open end housing 96 carries a pair of rotary cutters 110 and 112, these are cutter rotors adapted to cut trash and are provided with very hard rotor blades 114 and 116, respectively, which have a rotating path closely adjacent stationary cutter bars 118 and 120, respectively. These bars being carried by arms 122 and 124, respectively, supported in the housing 96.

The housing 96 may be integral with the duct section 78, as hereinbefore described, or may be pivoted, as shown in FIG. 1, and mounted in this housing in addition to the first and second cutting rotors 110 and 112 is a third trash cutting rotor 126 having radially dispose cutter blades 128 operable adjacent to and in the rotary path of a stationary cutter blade or bar 130, each blade 128 being adapted to pass a respective bar 130 in close proximity to shear trash therebetween. Likewise, the blades 116 operating in close shearing relation with the stationary bars 118 or blades 118 provides for the cutting of trash.

The rotor blades 116 travel in according to the direction of the arrows A and B in FIG. 4, inward toward each other and toward the third cutting rotor 126, and upwardly toward the interior of the duct structure of the invention, to impel cut trash upwardly and to impel the trash into cutting position relative to the rotary cutter 126.

As shown in FIG. 3 of the drawings, the rotary cutters 110 and 112 are in pairs, and four motors are used to operated these cutters 110 and 112, the cutters 110 being operable by motors 128 and 130 employing chain and sprocket drives 132 and 134, while the rotary cutters 112 are operated by a pair of motors 136 and 138 driving the cutter rotors 112 by means of chain drive mechanisms 140 and 142. The motors 128, 130, 136 and 138 are preferably high torque motors, such as hydraulic motors, or the like. The cutter rotor 126 is operated by a gear belt pulley 140 driven by a motor 142, shown best in FIGS. 1 and 6 of the drawings. This motor 142 also drives a hydraulic pump 144 which serves power to the motors 128, 130, 136 and 138.

The pulley 140 is disposed in a cover 150 which contains a gear belt drive to run the pulley 140, the motor 142 may be similar to a four cycle automotive gas engine, and may have sufficient cubic displacement and capabilities to produce 250 to 300 horse power.

Mounted on the open end housing 96 are a plurality of hydraulic cylinders 152 and 154 having respective extendable pistons 156 and 158 extendable in the broken line positions 160 and 166, respectively, shown best in FIGS. 4 and 6 of the drawings, for use as raking fingers relative to a pile of trash 166, as shown in FIG. 6 of the drawings. These fingers 160 and 162 extendable from the cylinders 152 and 154 may be maneuvered by pivoting and moving the duct structure of the invention by the various hydraulic actuating cylinders described in connection with FIGS. 1 and 2 of the drawings. Thus, a large pile of trash may be raked by the fingers 160 and 162 in order to determine whether or not there are any animals or other objects in a pile of trash which should not be cut and disposed of. The operator in the compartment 12 may thus maneuver the duct structure of the invention, and the trash raking fingers 160 and 162 to rake the trash out and to place it in position to be contacted and impelled by the rotary cutters 110, 112 and 126 and to thereby cut and impel the trash upward into the duct structure of the invention.

As shown in FIG. 6, the duct structure of the invention may move from the solid position to the broken line position in order to rake a pile of trash down by utilizing the extendable trash raking fingers 160 and 162. The disposition of the operator in the compartment 12 is such, that he may rake the pile of trash down, and pivot the open end structure 96 of the invention, as well as to dispose the trash in such a manner that he is able to determine whether or not there are any items in the trash that should not be cut and disposed of. Further, it will be appreciated by those skilled in the art that the telescopic relationship of the duct means, as well as its pivotal movement upward and laterally in both directions provide complete action for the disposition of the rotary cutters in cutting proximity with a pile of trash, and the rotary directions of the cutters, as shown in FIG. 4, permits limbs to be engaged by the cutter blades 116, such as to impel the trash upwardly and to shear it against the bars 118 and 120, and also to propel or impel it upwardly into contact with the cutting rotor 126.

A centrifugal blower 170, as shown in FIGS. 1 and 2 of the drawings, and in detail in FIG. 10 of the drawings, is adapted to create an aspirating flow in the duct section 20, as indicated by arrows 172. This aspirating air flow tends to assist the propelling of trash 174 moving in the duct section 20, and thus the propelling of the trash by the aforementioned rotary cutter is assisted by the aspirating flow of air, as indicated by arrows 172, furnished by the centrifugal blower 170.

Downstream from the blower 170 and located near the outlet end of the duct structure of the invention is a water dispensing manifold 176 which, as shown in detail in FIG. 11 of the drawings, is provided with a plurality of spray orifices 178 directed toward the interior of the duct section 20 in order to spray the trash, and particularly the small particles which are of dust size, so that this trash is wetted for more efficient compaction, and also sprayed with water to prevent the small particles from flying about as they are forced or pneumatically loaded into the box-shaped body 26 of the transport vehicle, hereinbefore described.

A water supply tank 180 is carried on the frame 14 of the truck, and a suitable high pressure water pump 182 by means of a conduit 184 delivers water to the manifold 176 for dispensation through the spray nozzles 178 to the interior of the duct section 20 of the invention to operate, as hereinbefore described.

I claim:

1. In a trash gathering, cutting, and disposing machine, the combination of: a motor vehicle having forward and rearward ends; said forward end having an area for carrying an operator; a duct structure mounted on said vehicle, and having an open trash pickup end extending beyond said forward end of said vehicle; a flexible intermediate section of said duct structure disposed to permit said pickup end to move up, down, and in side to side directions; a telescopic duct means for lengthening and shortening said duct structure between said flexible intermediate section and said open trash pickup end; power operated means for pivoting said duct structure at said pickup end in said up, down, and side to side directions; second power operated means for telescopically lengthening and shortening said duct structure at said telescopic duct means; and power operated cutting and impelling rotor means carried by said duct structure at said pickup end, said rotor means disposed to cut trash at said pickup open end, and to impel the cut trash into said duct structure; said duct structure having an open delivery end adapted to conduct cut and dispose trash into a second vehicle adjacent said first mentioned vehicle.

2. The invention, as defined in claim 1, wherein: said duct structure is provided with power actuated substantially downwardly extendable trash raking fingers disposed at said pickup open end, said fingers vertically movable upwardly and downwardly relative to said open pickup end.

3. The invention, as defined in claim 1, wherein: means is provided for introducing an aspirating air flow in said duct structure in a direction from said open pickup end into and through said duct structure.

4. The invention, as defined in claim 1, wherein: said open trash pickup end of said duct structure having a pivoted portion adapted to pivot on a horizontal axis for conforming with angular dispositions of trash on the ground; and power operated means for pivoting said last mentioned structure on said last mentioned axis.

5. In a trash gathering, cutting, and disposing machine, the combination of: a motor vehicle having forward and rearward ends; said forward end having an area for carrying an operator; a duct structure mounted on said vehicle, and having an open trash pickup end extending beyond said forward end of said vehicle; a flexible intermediate section of said duct structure disposed to permit said duct pickup end to move up, down, and in side to side directions; power operated means for pivoting said duct structure at said pickup end in said up, down and side to side directions; and power operated cutting and impelling rotor means carried by said duct structure at said pickup end; said rotor means disposed to cut trash near said pickup opening, and to impel the cut trash into said duct structure; said duct structure having an open delivery end adapted to conduct cut and disposed trash into second vehicle adjacent said first mentioned vehicle; said duct structure provided with power actuated substantially downwardly extendable trash raking fingers disposed in said pickup end; said fingers movable upwardly and downwardly relative to said open pickup end.

6. In a trash gathering, cutting, and disposing machine, the combination of: a motor vehicle having forward and rearward ends; said forward end having an area for carrying an operator; a duct structure mounted on said vehicle, and having an open trash pickup end extending beyond said forward end of said vehicle; a flexible intermediate section of said duct structure disposed to permit said duct pickup end to move up, down, and in side to side directions; power operated means for pivoting said duct structure at said pickup end in said up, down and side to side directions; and power operated cutting and impelling rotor means carried by said duct structure at said pickup end; said rotor means disposed to cut trash near said pickup opening, and to impel the cut trash into said duct structure; said duct structure having an open delivery end adapted to conduct cut and disposed trash into a second vehicle adjacent said first mentioned vehicle; said cutting and impelling rotor means comprising first and second substantially axially parallel spaced apart cutter rotors, each of said first and second cutter rotors having blades thereon; first and second stationary cutter blades adjacent respective rotary path of said rotor blades; said first and second stationary cutter blades carried by said duct structure near said open pickup end thereof; means for rotating said first and second cutting rotors in directions toward each other and upwardly toward the interior of said duct structure; and a third cutter rotor disposed in axially parallel relation to said first and second rotors; said third cutter rotor of relative larger diameter than said first and second cutter rotors, said third cutter rotor having a rotary axis disposed above that of said first and second cutter rotors, and disposed generally therebetween, said third rotary cutter having third cutter blades thereon; and third stationary cutter bars disposed adjacent the rotating paths of said cutter blades of said third cutter rotor, said third stationary cutter bars disposed and supported by said duct structure.

7. The invention, as defined in claim 6, wherein: a motor is carried by said duct structure, and disposed and connected for rotating said first, second and third cutter rotors of said power operated impelling and cutting rotor means.

References Cited

UNITED STATES PATENTS

| | | | |
|---|---|---|---|
| 983,293 | 2/1911 | Kundig-Honegger | 15—340 X |
| 1,356,272 | 10/1920 | Dunn | 15—340 X |
| 2,803,847 | 8/1957 | Hobbs | 15—314 |
| 3,031,836 | 5/1962 | Witt | 56—501 |
| 3,189,932 | 6/1965 | Daneman | 15—340 |
| 3,348,258 | 10/1967 | Daneman | 15—340 |
| 2,830,510 | 4/1958 | Mariani et al. | |
| 3,087,187 | 4/1963 | Hank et al. | 15—340 |

ROBERT W. MICHELL, Primary Examiner

U.S. Cl. X.R.

15—340, 354, 364, 384, 409